(12) United States Patent
Savitsky et al.

(10) Patent No.: US 12,182,801 B1
(45) Date of Patent: Dec. 31, 2024

(54) UNIVERSAL CORE BLOCKCHAIN WALLETS FOR ACCELERATED NETWORK ADDITIONS

(71) Applicant: Gemini IP, LLC, New York, NY (US)

(72) Inventors: Peter Savitsky, Sea Cliff, NY (US); Matthew Fors, Vancouver (CA); MD Islam, Brooklyn, NY (US); Brian Andrew KimJohnson, New York, NY (US); Brad Stachurski, Wellington, CO (US); Victor Reventos, Dallas, TX (US)

(73) Assignee: Gemini IP, LLC, New York, NY (US)

( * ) Notice: Subject to any disclaimer, the term of this patent is extended or adjusted under 35 U.S.C. 154(b) by 247 days.

(21) Appl. No.: 18/093,239

(22) Filed: Jan. 4, 2023

(51) Int. Cl.
*G06Q 20/36* (2012.01)
(52) U.S. Cl.
CPC .................. *G06Q 20/367* (2013.01)
(58) Field of Classification Search
CPC .................................................. G06Q 20/367
USPC ....................................................... 705/65
See application file for complete search history.

(56) References Cited

U.S. PATENT DOCUMENTS

| | | | |
|---|---|---|---|
| 2019/0375373 A1* | 12/2019 | Pepe | H04M 1/724098 |
| 2020/0213128 A1* | 7/2020 | Sharma | H04L 9/3226 |
| 2024/0257243 A1* | 8/2024 | Horoszczak | H04L 9/50 |

* cited by examiner

*Primary Examiner* — Zeshan Qayyum
(74) *Attorney, Agent, or Firm* — Lee & Hayes, P.C.

(57) ABSTRACT

Systems and methods for a digital asset wallet system to generate blockchain wallets using universal wallet libraries and/or modular wallet component(s) to implement first functionality that is universally shared across various blockchain networks. Additionally, network sidecar(s) may be generated for a given blockchain network to implement second functionality specific to the given blockchain network in tandem with the universal wallet libraries and/or modular components. The first functionality of the wallet library map then be mapped to the second functionality specific to the given blockchain network using the network sidecar(s). The digital asset wallet system may then generate a requested wallet based on the mapping between the first functionality of the wallet library and the second functionality of the network sidecar.

20 Claims, 10 Drawing Sheets

UNIVERSAL CORE BLOCKCHAIN WALLETS FOR ACCELERATED NETWORK ADDITIONS

BACKGROUND

Digital asset exchange platforms provide users with a means to send and/or receive cryptocurrency funds. Additionally, some digital asset exchange platforms provide blockchain wallet services that allow users to hold a balance of digital asset funds (e.g., coins, tokens, etc.). However, such wallets may be specific to a given blockchain network corresponding to the type of digital asset that they store, leading to an ever-expanding number of wallets required to provide the services. Each blockchain network may require network-specific functionality to deploy a given wallet, which can be very time consuming and redundant when integrating a new blockchain network. Moreover, these wallets often encounter scenarios when bug(s) are discovered and fixed in one wallet, but the same bug(s) have not been encountered in another wallet and therefore may not be fixed, leading to drift between such wallets.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
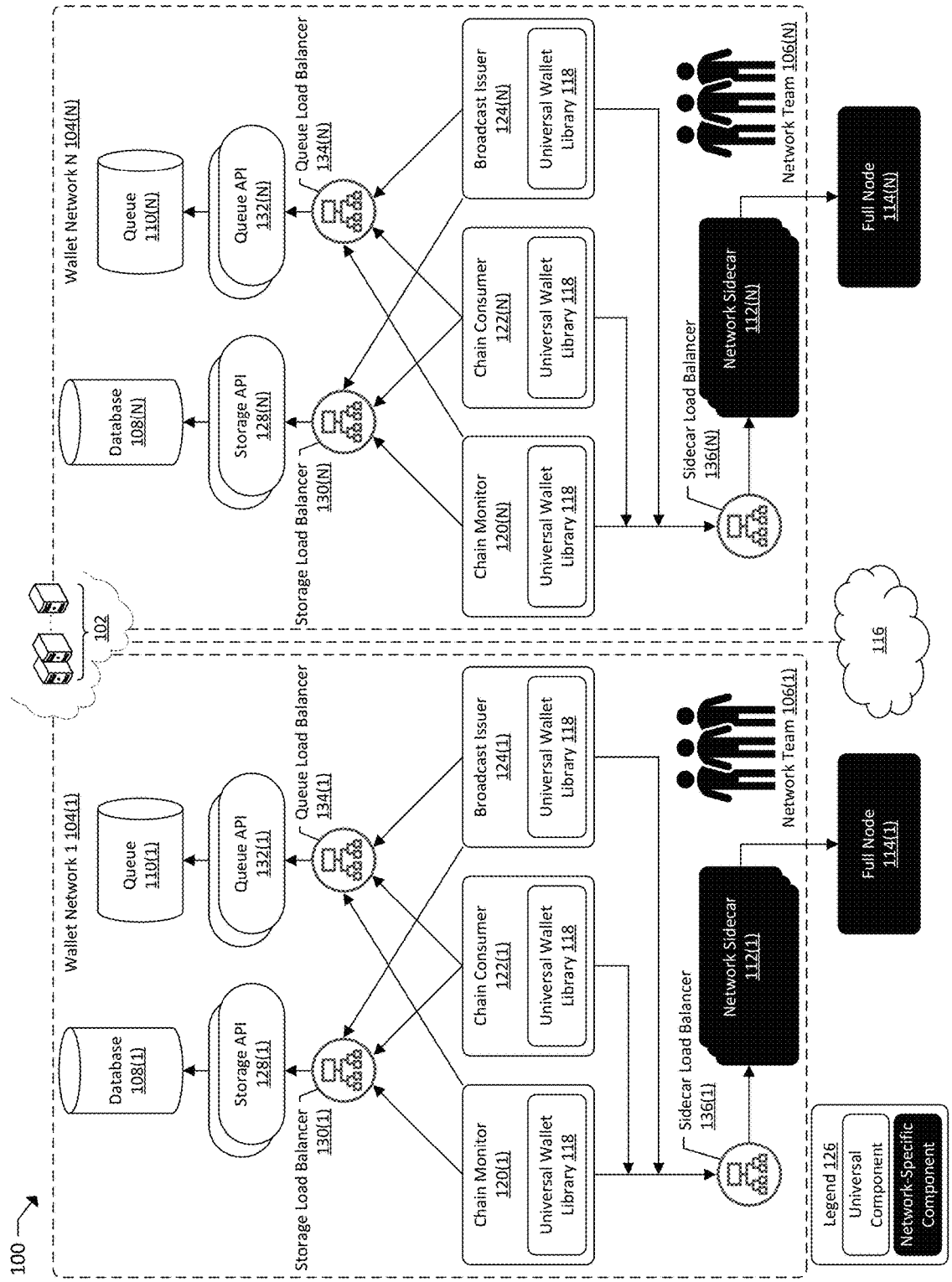
FIG. 1 illustrates an example environment for a digital asset exchange platform.

Existing account-based wallets offered by a digital asset exchange platform may share similar design in terms of composition, components, and/or functionality. However, the way such wallets are designed may couple together network logic and business logic, making it difficult to iterate on the system and may also greatly reduces the speed at which new networks may be added. For example, components and/or processes of these account-based wallets may be designed such that the services which are running are tightly coupled with the business logic inside them, and the business logic inside is tightly coupled with the network logic of the network (or network family) for which the wallet is provided.

Systems and methods are provided to compose blockchain wallets using universal wallet libraries and/or modular wallet component(s) to implement first functionality that is shared across a threshold number of various blockchain networks. Additionally, or alternatively, network sidecar(s) may be generated for a given blockchain network to implement second functionality specific to the given blockchain network in tandem with the universal wallet libraries and/or modular components. Composition of blockchain wallets in this way significantly increases the composability of a digital asset wallet service offered by a digital asset exchange platform, and by separating the contents of the wallet into defined logical categories, the digital asset exchange platform may be more adaptable to changing requirements over time. For example, if one did an iteration on the system (e.g., the digital asset wallet system) to introduce a new paradigm of networks (e.g., via UTXO), then components used in other wallets that are compatible with the new network(s) should not need to be recomposed, rather they should be utilized along with a network sidecar to compose a corresponding wallet.

The digital asset exchange platform may support separate networks (e.g., corresponding to particular blockchain networks) running independently and supported by a network team, each comprising a separate infrastructure such that each network may maintain its own storage, servers, and/or the network sidecar which it requires to implement the blockchain network specific functionality. In some examples, the separate wallet networks may be only accessible by the corresponding network team by way of a routing gateway associated with the digital asset exchange platform. That is, the routing gateway of the digital asset exchange platform may provide access to a given wallet network and/or functionality provided thereby to any service (e.g., exchange services, custody services, staking services, admin services, and the like) and/or component associated with a given wallet network As previously described, each network deployment may include its own infrastructure comprising one or more universal (or modular) components configured to implement service(s) of a blockchain wallet by utilizing a universal wallet library comprising first functionality shared across a threshold number of blockchain wallets, a database, one or more storage application programming interfaces (APIs) allowing the digital asset wallet service to access the database, a storage load balancer configured to distribute network traffic between the database and the various network deployments, a queue, one or more queue APIs allowing the digital asset wallet service to access the queue, a queue load balancer configured to distribute network traffic between the queue and the various network deployments, and/or a network sidecar load balancer configured to coordinate which blockchain network the wallet is running on using the network sidecar(s). The universal wallet library may be configured such that it implements functionality which exists across various blockchains that the wallets are built on. In this universal wallet library, there are no network specific details. Rather, the types defined in the library are used to represent data that is utilized by the core wallet, and the network sidecar(s) are configured to communicate with a full node and map the network specific details of the corresponding blockchain network to the universal wallet types in the wallet library. In this way, the modular components may be selected based on the requirements of a given blockchain network and utilized to compose a wallet and a corresponding network sidecar may be leveraged to map the network-specific functionality required by the blockchain network to the universal functionality associated with the universal library.

Take, for example, a digital asset exchange platform providing a digital asset wallet service configured to create and/or store wallets associated with blockchain networks of various types. Each of these wallets may include components and/or functionality that is shared between them. The digital asset exchange platform may be configured to generate one or more universal wallet libraries, each of the libraries being configured to implement functionality that is commonly shared across blockchain networks (e.g., functionality or similar functionality of a threshold number of blockchain wallets associated with different blockchain networks) for a requested wallet associated with a new blockchain network. In some examples, the digital asset exchange platform may determine first functionality that is shared amongst a threshold number of these wallets. Additionally, or alternatively, the digital asset exchange platform may determine first components of the wallets that are shared amongst the threshold number of these wallets. The digital asset exchange platform may then generate a wallet library (also referred to herein as a universal library) based on the first functionality and/or the first components. That is, the wallet library may be configured to implement the first functionality and/or the first components for a requested wallet associated with a new blockchain network. In this way, the digital asset exchange platform may utilize the wallet library to compose wallets for new blockchain networks that connect to the digital exchange platform.

For example, the digital asset exchange platform may receive a first request for a blockchain wallet associated with a first new blockchain network. In some examples, the first request may be received from a full node associated with the first new blockchain network. The digital asset exchange system may then determine second functionality of the requested wallet that is specific to the first new blockchain network. In some examples, the second functionality may be different from the first functionality and may be required by the first new blockchain network for the wallet to provide the wallet services. Once the digital asset exchange platform has determined the second functionality, the digital asset exchange platform may generate a first network sidecar associated with the first new blockchain network and based on the second functionality. In some examples, the first network sidecar may be configured to implement the second functionality of the requested wallet. Additionally, or alternatively, the first network sidecar may be configured to proxy the full node on behalf of the wallet. That is, the first network sidecar may communicate with the full node associated with the first new blockchain network to exchange network specific details between the digital asset exchange platform and the full node.

Further, the digital asset exchange platform may generate a first mapping between the wallet library and the first new blockchain network. For example, the digital asset exchange platform may utilize the first network sidecar to map first individual portions of the first functionality of the wallet library to second individual portions of the second functionality specific to the first new blockchain network. The digital asset exchange platform may then generate the requested wallet. In some examples, the digital asset exchange platform may generate the requested wallet based on the wallet library and/or the first network sidecar. Additionally, or alternatively, the digital asset exchange platform may generate the requested wallet based on the first mapping between the first individual portions of the first functionality of the wallet library and the second individual portions of the second functionality specific to the first new blockchain network.

The digital asset exchange platform may utilize the network sidecar to proxy full nodes for components of a blockchain wallet and perform various operations to handle blockchain events (e.g., deposit events, withdrawal events, and/or other blockchain events) associated with a blockchain wallet composed with the modular architecture described herein. The modular components may be configured to handle such events using the first functionality provided by the universal wallet library, and the second network-specific functionality communication with the full node via the corresponding network sidecar. Each wallet network may include any number of modular components. In some examples, the modular components may be configured to provide various services, or logical groupings of functionality which the wallet is required to provide.

For example, a first modular component may be configured as a chain monitor component (or service) for a wallet, a second modular component may be configured as a chain consumer component (or service) for a wallet, and/or a third modular component may be configured as a broadcast issuer component (or service) for a wallet. In some examples, the chain monitor component may be configured to, amongst other things, converge a known state of a blockchain and new blocks being introduced by executing block finder operations, identifying relevant data and persist blocks, and finalizing blocks. Additionally, or alternatively, the chain consumer component may be configured to, amongst other things, submit new broadcast intents, re-submit old broadcast intents, and/or execute a lazy sweep initiator. Additionally, or alternatively, the broadcast issuer component may be configured to, amongst other things, handle various blockchain events and broadcast such events and distribute data.

By utilizing the techniques described herein, a digital asset exchange platform may generate universal wallet libraries and/or modular wallet components used as a schema for generating blockchain wallets for new blockchain networks that connect to the digital asset exchange platform. Additionally, utilizing the techniques described herein, a digital asset exchange platform may generate a network sidecar configured to implement functionality specific to a given blockchain network and may map functionality associated with the universal wallet libraries and/or the wallet components to the functionality specific to a given blockchain network. The digital asset exchange platform may then generate, for a new blockchain network, a new blockchain wallet using relevant wallet libraries and/or wallet components and mapping the libraries and/or components to network specific functionalities using a network sidecar associated with the new blockchain network. Additionally, the digital asset exchange platform may have a higher fault tolerance by running each network independently. Composition of blockchain wallets in this way significantly increases the composability of a digital asset wallet service offered by a digital asset exchange platform and increases adaptability to changing requirements over time. That is, using the architecture described herein for generation of blockchain wallets allows for fast iterations, operational and full ownership flexibility, reusability of components, and removes the barrier to entry into the domain space (e.g., easier to create, maintain, and update wallets of various blockchain networks).

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates an example environment 100 for a digital asset exchange platform. The environment 100 may include, for example, a digital asset exchange system 102. The digital asset exchange system 102 may support separate wallet networks 104(1)-(N) (e.g., corresponding to particular blockchain networks) running independently and supported by a network team 106, each comprising a separate infrastructure such that each network 104 may maintain its own storage (e.g., database 108, queue 110), servers, and/or the network sidecar(s) 112 which it requires to proxy a full node 114 and implement the blockchain network specific functionality. The components of each of these devices and/or systems will be described below by way of example. Each of the devices and/or systems may be configured to communicate with each other via one or more networks 116.

In some examples, the separate wallet networks 104 may be only accessible by the corresponding network team 106 by way of a routing gateway associated with the digital asset exchange system 102. That is, the routing gateway of the digital asset exchange system 102 may provide access to a given wallet network 104 and/or functionality provided thereby to any service (e.g., exchange services, custody services, staking services, admin services, and the like) and/or component associated with a given wallet network 104.

Specifically, the digital asset exchange system 102 may be configured to perform various processes as described herein and to generate blockchain wallets using universal wallet libraries 118 and/or modular wallet component(s) 120, 122, 124 to implement first functionality that is universally shared across various blockchain networks. Additionally, or alternatively, the digital asset exchange system may be configured to generate network sidecar(s) 112 for a given blockchain network to implement second functionality specific to the given blockchain network in tandem with the universal wallet libraries 118 and/or modular components 120, 122, 124. The functionality of each of the components 120, 122, 124 may be understood with respect to the legend 126 (e.g., universal components implementing the first functionality that is universally shared across a threshold number of blockchain networks and network-specific components implementing the second functionality specific to the blockchain network associated with the connected full node 114).

As previously described, the digital asset exchange system 102 may support wallet networks 104 running independently of one another. In some examples, each wallet network 104 may infrastructure, including one or more components such as, for example, one or more processor(s), one or more network interface(s), one or more routing gateway(s), and/or memory. The memory may include components such as, for example, one or more universal (or modular) components 120, 122, 124 configured to implement service(s) of a blockchain wallet by utilizing a universal wallet library 118 comprising first functionality shared across a threshold number of blockchain wallets, a database 108, one or more storage application programming interfaces (APIs) 128 allowing the digital asset wallet service to access the database, a storage load balancer 130 configured to distribute network traffic between the database 108 and the various network deployments, a queue 110, one or more queue APIs 132 allowing the digital asset wallet service to access the queue 110, a queue load balancer 134 configured to distribute network traffic between the queue 110 and the various network deployments, and/or a network sidecar load balancer 136 configured to coordinate which blockchain network the wallet is running on using the network sidecar(s) 112. Each of these components will be described in more detail below.

The universal wallet library 118 may be configured such that it implements functionality which exists across various blockchains that the wallets are built on. In this universal wallet library 118, there are no network specific details. Rather, the types defined in the library 118 are used to represent data that is utilized by the core wallet, and the network sidecar(s) 112 are configured to communicate with a full node 114 and map the network specific details of the corresponding blockchain network to the universal wallet types in the wallet library 118. In this way, the modular components may be selected based on the requirements of a given blockchain network and utilized to compose a wallet and a corresponding network sidecar may be leveraged to map the network-specific functionality required by the blockchain network to the universal functionality associated with the universal library.

Take, for example, a digital asset exchange platform 102 providing a digital asset wallet service configured to create and/or store wallets associated with blockchain networks of various types. Each of these wallets may include components and/or functionality that is shared between them. The digital asset exchange platform 102 may be configured to generate one or more universal wallet libraries 118, each of the libraries 118 being configured to implement functionality that is commonly shared across blockchain networks (e.g., functionality or similar functionality of a threshold number of blockchain wallets associated with different blockchain networks) for a requested wallet associated with a new blockchain network. It should be appreciated that the universal wallet libraries 118 may be configured such that they are all the same or such that they are all different. In some examples, the digital asset exchange platform 102 may determine first functionality that is shared amongst a threshold number of these wallets. Additionally, or alternatively, the digital asset exchange platform 102 may determine first components 120, 122, 124 of the wallets that are shared amongst the threshold number of these wallets. The digital asset exchange platform may then generate a wallet library 118 (also referred to herein as a universal library) based on the first functionality and/or the first components. That is, the wallet library 118 may be configured to implement the first functionality and/or the first components for a requested wallet associated with a new blockchain network. In this way, the digital asset exchange platform 102 may utilize the wallet library 118 to compose wallets for new blockchain networks that connect to the digital exchange platform 102.

For example, the digital asset exchange platform 102 may receive a first request for a blockchain wallet associated with a first new blockchain network. In some examples, the first request may be received from a full node 114(1) associated with the first new blockchain network. As illustrated by FIG. 1, wallet network 1 104(1) may correspond to the first new blockchain network associated with the full node 114(1). Additionally, or alternatively, wallet network N 104(N) may correspond to a second new blockchain network associated with another full node 114(N). While FIG. 1 illustrates two wallet networks 104(1), 104(N), any number of wallet networks may be spun up to accommodate for new blockchain networks.

The digital asset exchange system 102 may then determine second functionality of the requested wallet that is specific to the first new blockchain network. In some examples, the second functionality may be different from the first functionality and may be required by the first new blockchain network for the wallet to provide the wallet services. Once the digital asset exchange platform 102 has determined the second functionality, the digital asset exchange platform 102 may generate a first network sidecar 112(1) associated with the first new blockchain network and based on the second functionality. In some examples, the first network sidecar 112(1) may be configured to implement the second functionality of the requested wallet. Additionally, or alternatively, the first network sidecar 112(1) may be configured to proxy the full node 114(1) on behalf of the wallet. That is, the first network sidecar 112(1) may communicate with the full node 114(1) associated with the first new blockchain network to exchange network specific details between the digital asset exchange platform 102 and the full node 114(1).

Further, the digital asset exchange platform 102 may generate a first mapping between the wallet library 118 and the first new blockchain network. For example, the digital asset exchange platform 102 may utilize the first network sidecar 112(1) to map first individual portions of the first functionality of the wallet library 118 to second individual portions of the second functionality specific to the first new blockchain network. The digital asset exchange platform 102 may then generate the requested wallet. In some examples, the digital asset exchange platform 102 may generate the requested wallet based on the wallet library 118 and/or the first network sidecar 112(1). Additionally, or alternatively, the digital asset exchange platform 102 may generate the requested wallet based on the first mapping between the first individual portions of the first functionality of the wallet library 118 and the second individual portions of the second functionality specific to the first new blockchain network.

The digital asset exchange platform 102 may utilize the network sidecar to proxy full nodes 114(1) for components of a blockchain wallet and perform various operations to handle blockchain events (e.g., deposit events, withdrawal events, and/or other blockchain events) associated with a blockchain wallet composed with the modular architecture described herein. The modular components 120, 122, 124 may be configured to handle such events using the first functionality provided by the universal wallet library 118, and the second network-specific functionality communication with the full node 114 via the corresponding network sidecar 112. While FIG. 1 illustrates three modular components 120, 122, 124 in each wallet network 104, any number of modular components may be utilized. In some examples, the modular components 120, 122, 124 may be configured to provide various services, or logical groupings of functionality which the wallet is required to provide.

For example, a first modular component 120 may be configured as a chain monitor component 120 (or service) for a wallet, a second modular component 122 may be configured as a chain consumer component 122 (or service) for a wallet, and/or a third modular component 124 may be configured as a broadcast issuer component 124 (or service) for a wallet. In some examples, the chain monitor component 120 may be configured to, amongst other things, converge a known state of a blockchain and new blocks being introduced by executing block finder operations, identifying relevant data and persist blocks, and finalizing blocks. Additionally, or alternatively, the chain consumer component 122 may be configured to, amongst other things, submit new broadcast intents, re-submit old broadcast intents, and/or execute a lazy sweep initiator. Additionally, or alternatively, the broadcast issuer component 124 may be configured to, amongst other things, handle various blockchain events and broadcast such events and distribute data.

It should be noted that the exchange of data and/or information as described herein may be performed only in situations where a user has provided consent for the exchange of such information. For example, a user may be provided with the opportunity to opt in and/or opt out of data exchanges between devices and/or with the systems and/or for performance of the functionalities described herein. Additionally, when one of the devices is associated with a first user account and another of the devices is associated with a second user account, user consent may be obtained before performing some, any, or all of the operations and/or processes described herein.

As used herein, a processor may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

The memory may include volatile and nonvolatile memory, removable and non-removable media implemented in any method or technology for storage of information, such as computer-readable instructions, data structures, program component, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) may enable messages between the components and/or devices shown in system 100 and/or with one or more other remote systems, as well as other networked devices. Such network interface(s) may include one or more network interface controllers (NICs) or other types of transceiver devices to send and receive messages over the network.

For instance, each of the network interface(s) may include a personal area network (PAN) component to enable messages over one or more short-range wireless message channels. For instance, the PAN component may enable messages compliant with at least one of the following standards IEEE 702.15.4 (ZigBee), IEEE 702.15.1 (Bluetooth), IEEE 702.11 (WiFi), or any other PAN message protocol. Furthermore, each of the network interface(s) include a wide area network (WAN) component to enable message over a wide area network.

While various components of the digital asset exchange system 102 have been labeled and named in this disclosure and each component has been described as being configured to cause the processor(s) to perform certain operations, it should be understood that the described operations may be performed by some or all of the components and/or other components not specifically illustrated.

FIGS. 2A-6 illustrate processes 200-600 for cryptocurrency exchange platforms. The processes 200-600 described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes 200-600 are described with reference to the environments, architectures and systems described in the examples herein, such as, for example those described with respect to FIGS. 1, 7, and/or 8, although the processes 200-600 may be implemented in a wide variety of other environments, architectures and systems.

Figure 2A:
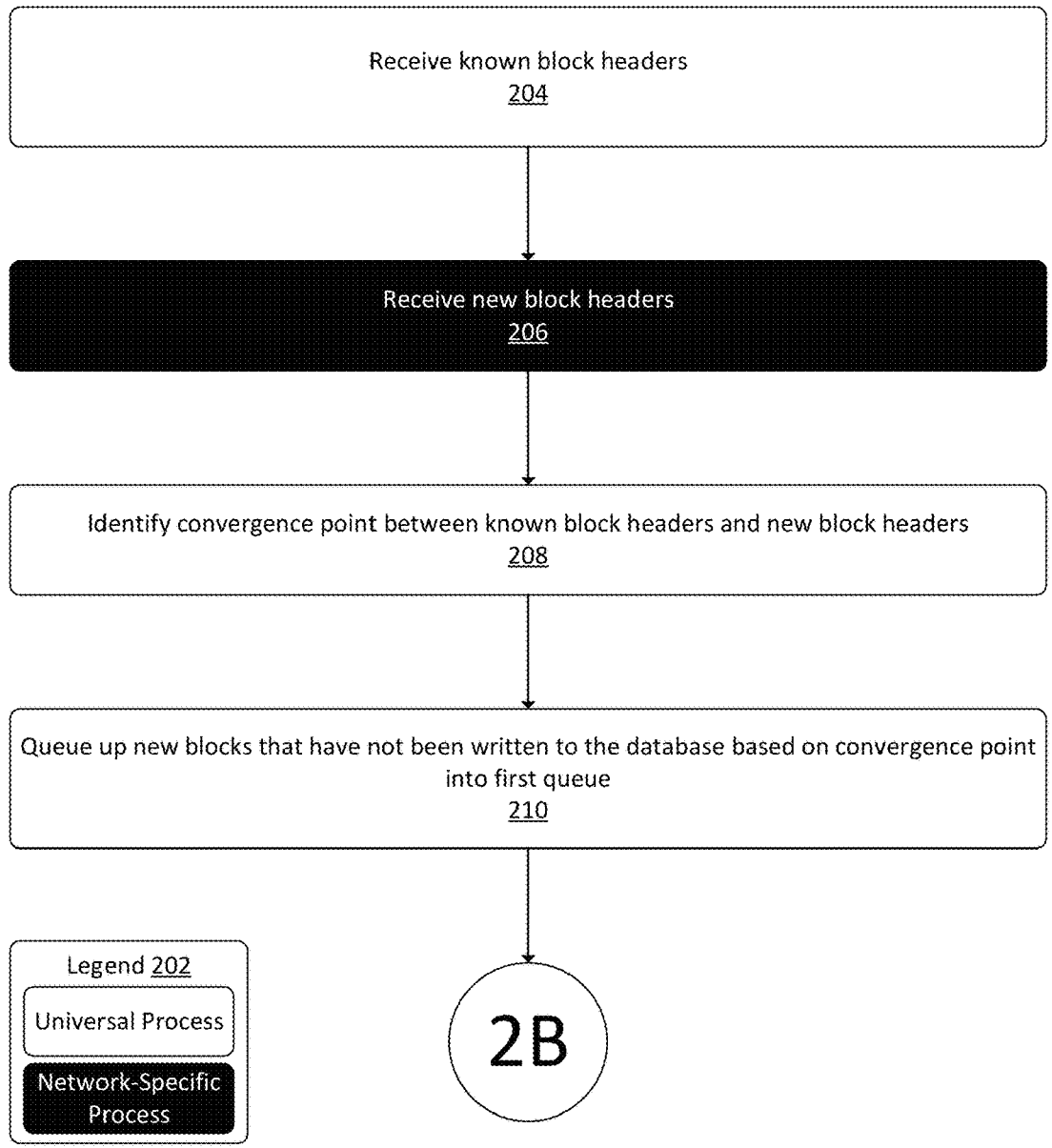
FIGS. 2A-2C illustrate a flow diagram of an example process for a digital asset exchange platform to converge a known state of a blockchain and new blocks that are being introduced.
Figure 2B:
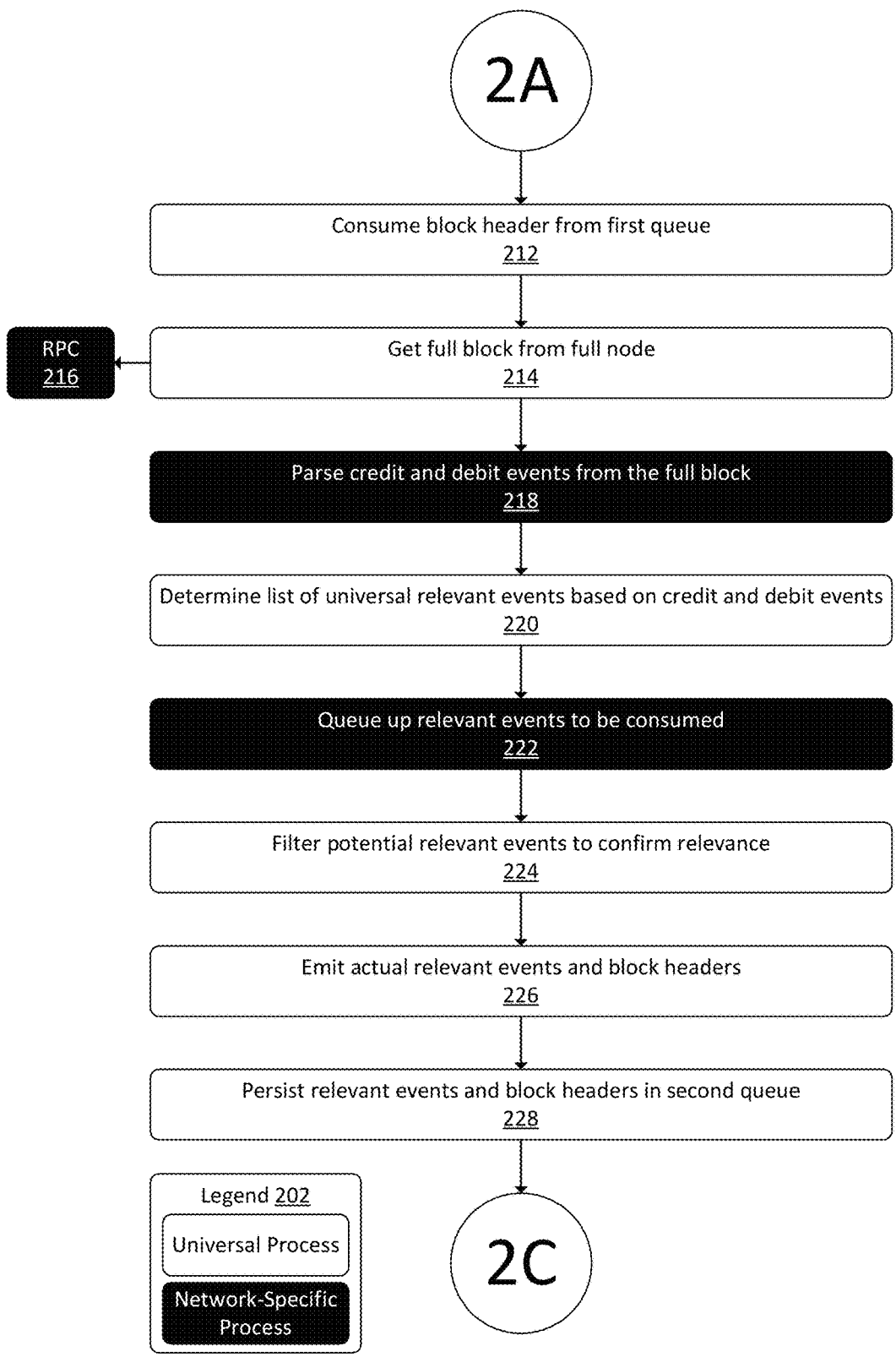
Figure 2C:
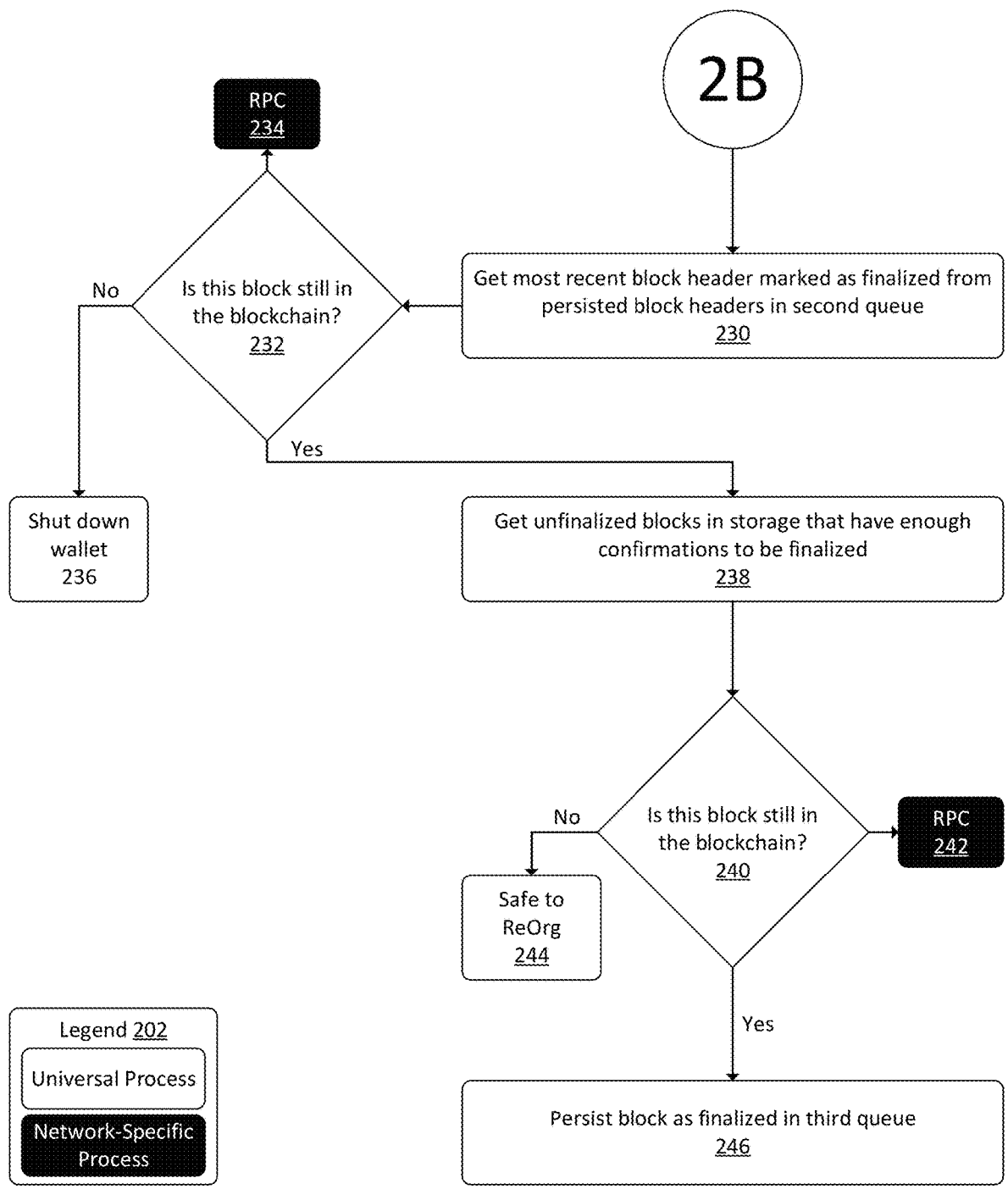

As previously described, the chain monitor component 120 may be configured to converge a known state of a blockchain and new blocks being introduced. FIGS. 2A-2C illustrate a flow diagram of an example process 200 for a digital asset exchange platform 102 (or a modular component thereof configured as a chain monitor component 120) to converge a known state of a blockchain and new blocks that are being introduced. The functionality of the process 200 may be understood with respect to the legend 202 (e.g., the digital asset exchange platform 102 may be configured to utilize the chain monitor component 120 to implement the universal process(es) that are shared across a threshold number of blockchain networks, and/or a network sidecar 112 to implement the network-specific process(es)).

FIG. 2A illustrates a first stream of the process 200 corresponding to block finding functionality of the chain monitor component 120. The block finding functionality is configured to converge known blockchain state and new blocks that are being introduced. In some examples, the process may shutdown a given wallet if the recorded state cannot be reconciled with the state being reported by the full node 114. At 204, the process 200 includes receiving known block headers. In some examples, the known block headers may be stored in the database 108 and/or the queue 110. At 206, the process 200 includes receiving new block headers. In some examples, the new block headers may be received from the full node 114.

At 208, the process may include identifying a convergence point between the known block headers and the new block headers. As a result, the chain monitor component 120 may emit new blocks if there exists a point to converge on. At 210, the process 200 includes queuing up new blocks that have not been written to the database 208 into a first queue based on a convergence point.

FIG. 2B illustrates a second stream of the process 200 corresponding to processing block headers found by the first stream. At 212, the process 200 includes consuming block headers from the first queue. In some examples, the chain monitor component 120 may utilize the queue API 132 to dequeue the block headers from the first queue. At 214, the process 200 includes receiving the full block from the full node 114 corresponding to the consumed block header. At 216, the process 200 includes a remote procedure call (RPC) to receive the full block from the full node 114. At 218, the process 200 includes parsing credit and debit events from the full block. At 220, the process 200 includes determining a list of universal relevant events based on credit and debit events, where a relevant event is an event on the blockchain which the wallet may care about (e.g., a potential deposit, a transaction sent by the wallet, etc.). That is, given a block header consumed from the first queue, the full block is received and the chain monitor component 120 reasons about which portions of the block need to be persisted.

At 222, the process 200 includes queuing up relevant events to be consumed. At 224, the process 200 includes filtering potential relevant events to confirm such relevance (e.g., confirmation checks). At 226, the process 200 includes emitting relevant events that were confirmed at step 224. In some examples, the relevant events may be added to an events queue, where they may be handled downstream. At 228, the process 200 includes persisting the relevant events and block headers in a second queue. All relevant events are persisted so that they can be actioned upon by other services (e.g., the chain consumer component 122 and/or the broadcast issuer component 124). In some examples, if no relevant events are discovered, the second stream of the process 200 may periodically (e.g., every 10 blocks) write an irrelevant block to the database 108 to act as a waterline for block discovery traversal.

FIG. 2C illustrates a third stream of the process 200 corresponding to verifying that blocks remain in the blockchain according to the full node 114. At 230, the process 200 includes receiving the most recent block header marked as finalized from persisted block headers added to the second queue. At 232, the process 200 includes determining whether the block is still in the blockchain. At 234, the process 200 includes an RPC to receive the full block from the full node 114. If it is determined that the block does not remain in the blockchain, then the process 200 proceeds to 236 and the wallet is shut down. Alternatively, if it is determined that the block remains in the blockchain, then the process 200 proceeds to 238.

At 238, the process 200 includes receiving unfinalized blocks from the database 108 that have enough confirmations to be finalized. At 240, the process 200 includes determining whether the block is still in the blockchain. At 242, the process 200 includes an RPC to receive the full block from the full node 114. If it is determined that the block does not remain in the blockchain, then the process 200 proceeds to 244 where a chain reorganization may be performed. Alternatively, if it is determined that the block remains in the blockchain, then the process 200 proceeds to 246. At 246, the process 200 includes persisting the block as finalized in a third queue, for later downstream processing.

Figure 3:
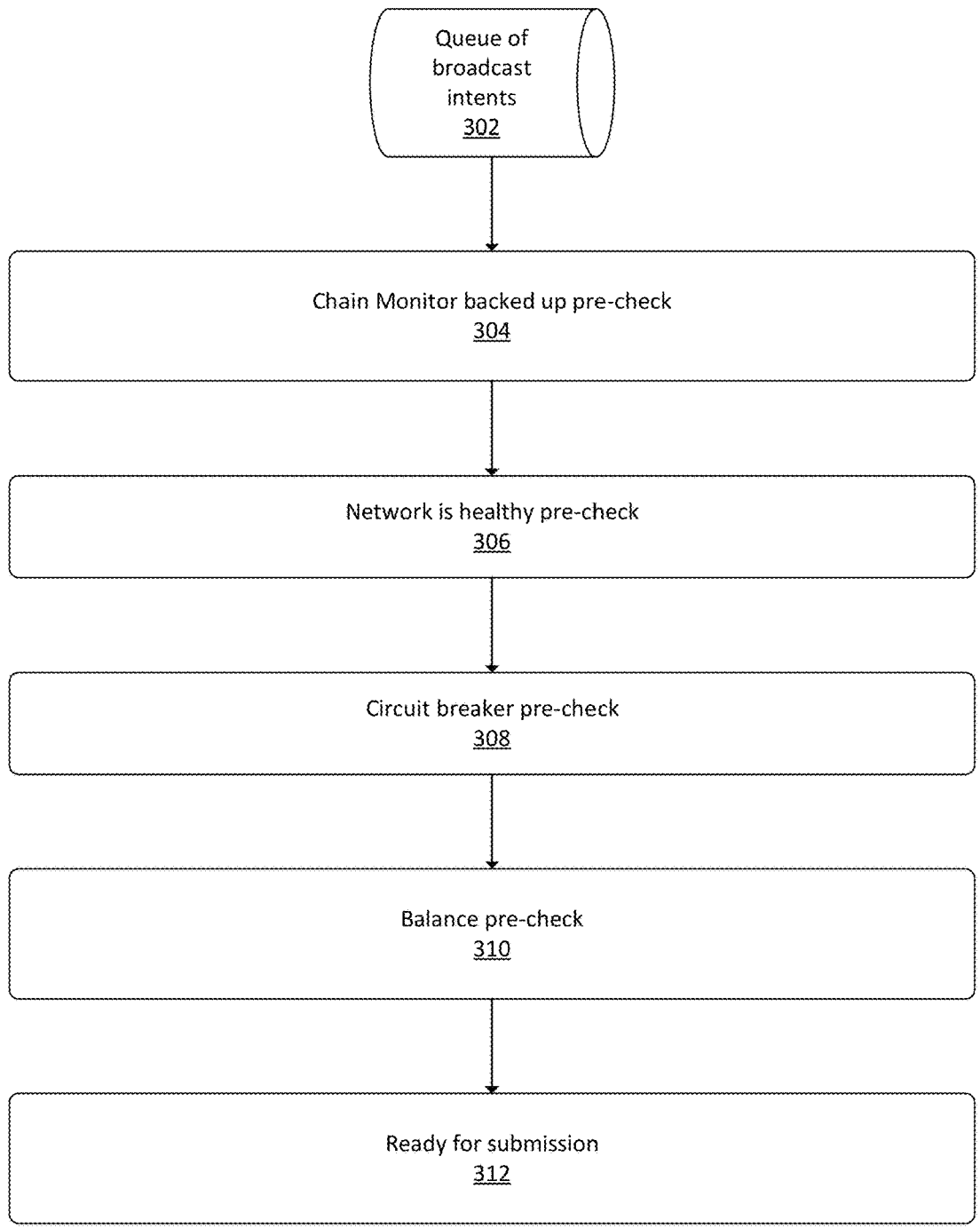
FIG. 3 illustrates a flow diagram of an example process for a digital asset exchange platform to perform various pre-checks before broadcasting events.

Referring back to FIG. 1, as previously described, the broadcast issuer component 124 may be configured to, amongst other things, handle various blockchain events and broadcast such events and distribute data. FIG. 3 illustrates a flow diagram of an example process 300 for a digital asset exchange platform 102 (or a modular component thereof configured as a broadcast issuer component 124) to perform various pre-checks before broadcasting events.

At 304, the process 300 includes consuming a broadcast intent from a queue of broadcast intents and performing a pre-check to ensure the chain monitor component 120 is backed up. At 306, the process 300 includes a pre-check to confirm that the network is executing properly. At 308, the process 300 includes a pre-check to confirm that the circuit breaker is executing properly. At 310, the process 300 includes a pre-check to verify the balance. In some examples, if all of the pre checks 304-310 are passed, the process 300 may advance to 312 where it is determined that a broadcast is ready for submission.

Figure 4:
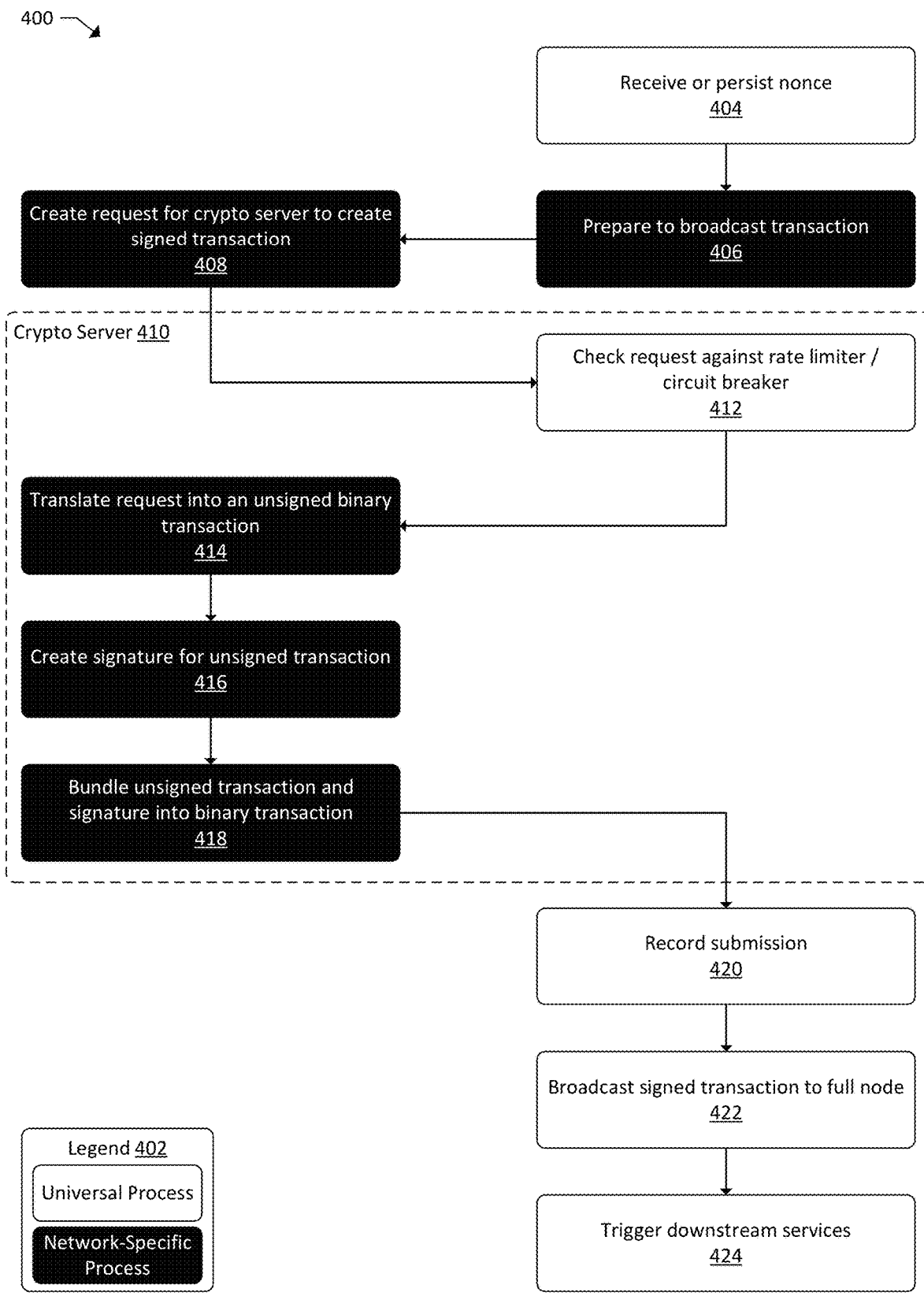
FIG. 4 illustrates a flow diagram of an example process for a digital asset exchange platform to utilize network specific components and universal components to submit transactions associated with a universal blockchain wallet onto a corresponding blockchain.

FIG. 4 illustrates a flow diagram of an example process for a digital asset exchange platform 102 (or a modular component thereof configured as a chain consumer component 122) to utilize network specific components and universal components to submit transactions associated with a universal blockchain wallet onto a corresponding blockchain. The functionality of the process 400 may be understood with respect to the legend 402 (e.g., the digital asset exchange platform 102 may be configured to utilize the broadcast issuer component 124 to implement the universal process(es) that are shared across a threshold number of blockchain networks, and/or a network sidecar 112 to implement the network-specific process(es)).

At 404, the process 400 includes receiving or persisting a nonce from the third queue of persisted blocks as described with respect to FIG. 2C. At 406, the process 400 includes preparing to broadcast a transaction associated with the nonce. At 408, the process 400 may include creating a request for a crypto server 410 to create a signed transaction. At 412, the process 400 may include checking the request to create the signed transaction against a rate limiter and/or circuit breaker. Then, at 414, the process 400 includes translating the request into an unsigned binary transaction. At 416, the process 400 includes creating a signature for the unsigned transaction, and at 418, the process 400 includes bundling the unsigned transaction and the signature for the unsigned transaction into a binary signed transaction. Once the crypto server 410 has bundled the unsigned transaction and the signature into the binary signed transaction, the signed transaction may be returned to the wallet. Then, the wallet is responsible for safely storing and submitting the signed transaction onto the chain. On successful transactions broadcast, some downstream services are triggered for account related reporting. For example, at 420, the process 400 includes recording the submission, and at 422, the process 400 includes broadcasting the signed transaction to the full node 114. As previously mentioned, at 424, the process 400 may trigger downstream services associated with the wallet.

Figure 5:
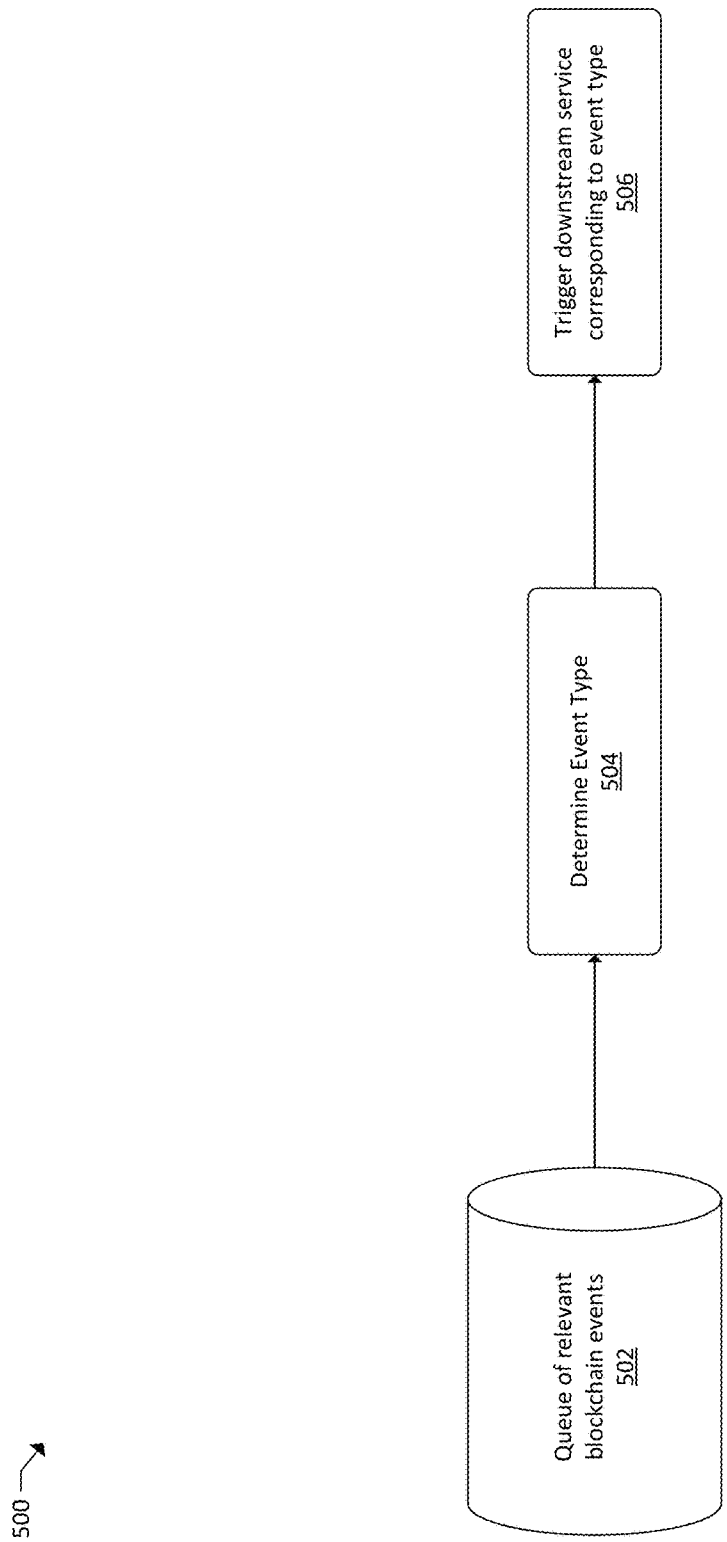
FIG. 5 illustrates a flow diagram of example downstream process(es) for a digital asset exchange system.

Referring back to FIG. 1, as previously described, the chain consumer component 122 may be configured to, amongst other things, submit new broadcast intents, re-submit old broadcast intents, and/or execute a lazy sweep initiator. FIG. 5 illustrates a flow diagram of example downstream process(es) 500 for a digital asset exchange system 102 (or a modular component thereof configured as a chain consumer component 122).

At 504, the process 500 includes determining a type of an event. In some examples, the event may be received from a queue 502 comprising relevant blockchain events such as, for example, depositables, withdrawal completions, and/or other universal blockchain events. For example, a first cohort associated with a first service offered by the digital asset exchange platform (e.g., a staking service) may receive a first event from the queue 502. The first event may be a credit event and the staking service may determine that the credit event is a staking award associated with an account managed by the staking service. Additionally, or alternatively, a second cohort associated with a second service offered by the digital asset exchange platform (e.g., an exchange service) may receive a second event from the queue 502. The second event may be a credit event and the exchange service may determine that the credit event is associated with an account managed by the exchange service being credited on the ledger. At 504, once the type of event is determined, the process 500 may proceed to 506. At 506, the process 500 includes triggering downstream services corresponding to the event type. Considering the example described above, the first cohort may have one or more downstream services triggered to action on the first event and/or the second cohort may have one or more downstream services triggered to action on the second event. For example, a downstream service associated with the first cohort may be configured to award the account managed by the staking service based on the staking award. Additionally, or alternatively, a downstream service associated with the second cohort may be configured to credit the account managed by the exchange service on the ledger based on the second event.

Figure 6:
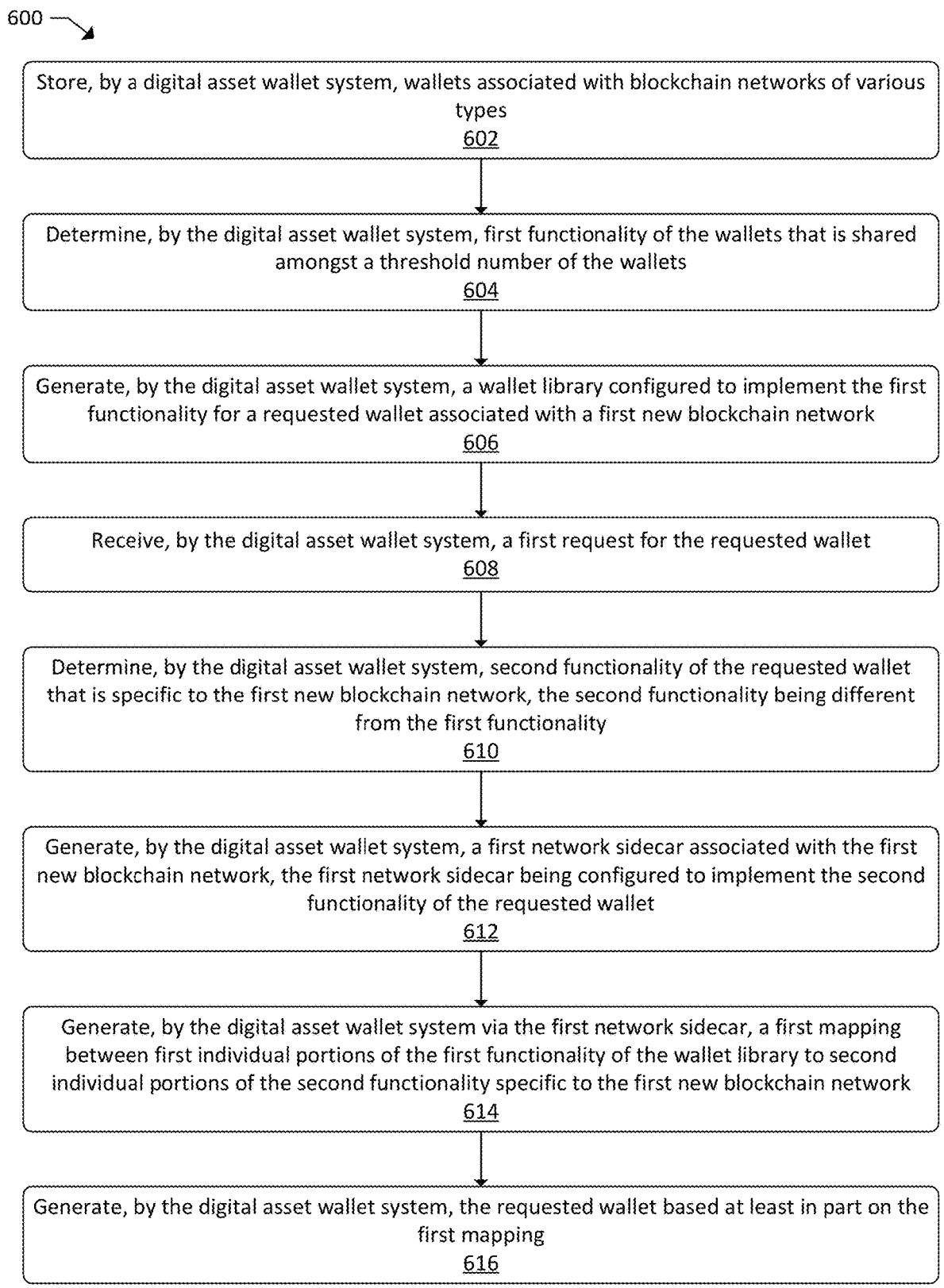
FIG. 6 illustrates a flow diagram of an example process for a digital asset exchange platform to generate requested blockchain wallet(s) by mapping first functionality of a wallet library, generated based on the first functionality being shared across a threshold number of various blockchain networks, and second functionality specific to a blockchain network corresponding to the requested wallet.

FIG. 6 illustrates a flow diagram of an example process 600 for a digital asset exchange platform to generate requested blockchain wallet(s) by mapping first functionality of a wallet library, generated based on the first functionality being universally shared across various blockchain networks, and second functionality specific to a blockchain network corresponding to the requested wallet.

At block 602, the process 600 may include storing, by the digital asset wallet system, wallets associated with blockchain networks of various types. In some examples, the digital asset wallet system may correspond to the digital asset exchange platform 102 as described with respect to FIG. 1. Additionally, or alternatively, the digital asset wallet system may be configured to create and/or store wallets associated with blockchain networks of various types. Each of these wallets may include components and/or functionality that is shared between them.

At block 604, the process 600 may include determining, by the digital asset wallet system, first functionality of the wallets that is shared amongst a threshold number of the wallets. Additionally, or alternatively, the process 600 may include determining first components of the wallets that are shared amongst a threshold number of the wallets. In some examples, the threshold number of wallets may be configured such that the functionality must be present in all wallets to satisfy the threshold and/or such that the functionality must be present in a majority of the wallets to satisfy the threshold.

At block 606, the process 600 may include generating, by the digital asset wallet system, a wallet library configured to implement the first functionality for a requested wallet associated with a first new blockchain network. In some examples, the wallet library may correspond to the universal wallet library 118 as described with respect to FIG. 1. In some examples, the digital asset wallet system may generate one or more wallet libraries, where each of the libraries may be configured to implement functionality that is commonly shared across blockchain networks (e.g., functionality or similar functionality of a threshold number of blockchain wallets associated with different blockchain networks). Additionally, or alternatively, the wallet libraries may be configured such that they are all the same or such that they are all different.

At block 608, the process 600 may include receiving, by the digital asset wallet system, a first request for the requested wallet. In some examples, the first request may be received from a full node associated with the first new blockchain network.

At block 610, the process 600 may include determining, by the digital asset wallet system, second functionality of the requested wallet that is specific to the first new blockchain network. In some examples, the second functionality may be different from the first functionality. Additionally, or alternatively, the second functionality may be required by the first new blockchain network for the wallet to provide the wallet services.

At block 612, the process 600 may include generating, by the digital asset wallet system, a first network sidecar associated with the first new blockchain network. In some examples, the first network sidecar may be configured to implement the second functionality of the requested wallet. Additionally, or alternatively, the first network sidecar may be configured similar to the network sidecar 112(1) as described with respect to FIG. 1. Additionally, or alternatively, the first network sidecar may be configured to proxy the full node on behalf of the wallet. That is, the first network sidecar may communicate with the full node associated with the first new blockchain network to exchange network specific details between the digital asset wallet system and the full node 114.

At block 614, the process 600 may include generating a first mapping between the first functionality of the wallet library and the second functionality specific to the first blockchain network. For example, the first mapping may indicate first individual portions of the first functionality of the wallet library that are to be mapped to second individual portions of the second functionality specific to the first new blockchain network. In some examples, the mapping may be generated by the digital asset wallet system and utilizing the first network sidecar.

At block 616, the process 600 may include generating the requested wallet. In some examples, the requested wallet may be generated by the digital asset wallet system. Additionally, or alternatively, the digital asset wallet system may generate the requested wallet based on the wallet library and/or the first network sidecar. Additionally, or alternatively, the digital asset wallet system may generate the requested wallet based on the first mapping between the first individual portions of the first functionality of the wallet library and the second individual portions of the second functionality specific to the first new blockchain network.

In some examples, the requested wallet may be configured as a core wallet.

Additionally, or alternatively, the process 600 may further include verifying, by the digital asset wallet system and using the network sidecar, transaction records associated with the core wallet based at least in part on the full node.

In some examples, the wallet library may be a first wallet library. Additionally, or alternatively, the requested wallet may be a first requested wallet. Additionally, or alternatively, the process 600 may include determining, by the digital asset wallet system, third functionality of the wallets that is shared amongst the threshold number of wallets. In some examples, the third functionality may be different from the first functionality and the second functionality. Additionally, or alternatively, the process 600 may include generating a second wallet library configured to implement the third functionality for a second requested wallet. Additionally, or alternatively, the process 600 may include generating, by the digital asset wallet system via a second network sidecar associated with the second new blockchain network, a second mapping between third individual portions of the third functionality of the second wallet library and fourth individual portions of fourth functionality specific to the second new blockchain network. Additionally, or alternatively, the process 600 may include generating, by the digital asset wallet system, the second requested wallet based at least in part on the second mapping.

Figure 7:
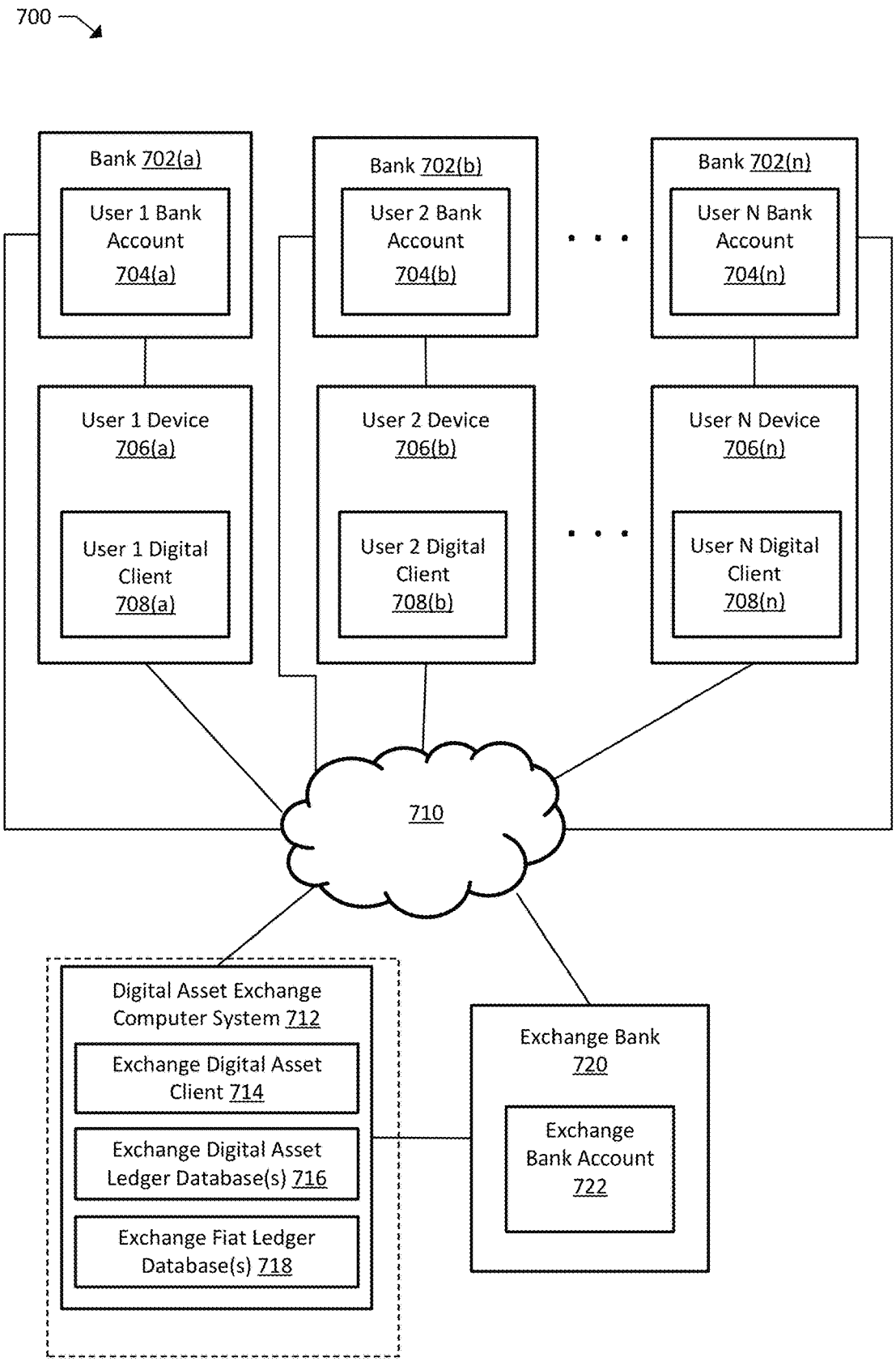
FIG. 7 illustrates a schematic diagram of exemplary participants in a system employing a digital asset exchange.

FIG. 7 illustrates a schematic diagram 700 of exemplary participants in a system employing a digital asset exchange. In a digital asset exchange, one or more customers of the exchange (e.g., User 1, User 2, User 3, etc.) connect via a network 710 (e.g., the Internet, a local area network, a wide area network, etc.) to a digital asset exchange computer system 712, using respective one or more user electronic devices 706 (e.g., 706(a), 706(b), ..., 706(n)), such as computers, laptops, tablet computers, televisions, mobile phones, smartphones, and/or PDAs, etc. Each user may also have user bank accounts 704 held at one or more corresponding banks 702 (e.g., User 1 will have a User 1 Bank Account 704(a) at Bank 702(a), User 2 will have User 2

Bank Account 704(*b*) at Bank 702(*b*), etc.), which in turn may be accessed by a corresponding user device (e.g., User 1 Device 706(*a*), User 2 Device 706(*b*), etc.). In embodiments, functionality may be installed on a bank mobile application, which may access an application programing interface (API) of one or more exchanges. Similarly, each user may (or may not) also maintain a digital client (e.g., User 1 Digital Client 708(*a*), User 2 Digital Client 708(*b*), etc.), either on their respective user device or in some cases offline, to facilitate access to their respective bank accounts from a user device and/or from a digital client or digital address associated therewith.

The participants may be connected directly and/or indirectly, such as through a data network 710, as discussed herein. Users of a digital asset exchange may be customers of the digital asset exchange, such as digital asset buyers and/or digital asset sellers. Digital asset buyers may pay fiat (e.g., U.S. Dollars, Euro, Yen, British Pound, Swiss Franc, Canadian Dollar, Australian Dollar, New Zealand Dollar, Kuwaiti Dinar, Bahrain Dinar, Oman Rial, Jordan Dinar, Cayman Island Dollar, South African Rand, Mexican Pesos, Renminbi, to name a few) in exchange for digital assets. Digital asset sellers may exchange digital assets for fiat or other digital assets.

The digital asset exchange computer systems 712 may track the users' respective digital assets in the one or more exchange digital asset ledger databases 716 associated with the respective digital asset. For example, respective users' BITCOIN assets available for trading will be tracked in a BITCOIN exchange ledger. In turn, the respective digital assets themselves will be maintained in exchange digital clients that are controlled by the one or more private keys associated with each digital client.

Similarly, the digital asset exchange computer system 712 will track the users' respective fiat in one or more exchange fiat databases 718 associated with the respective fiat. For example, respective users' U.S. Dollar assets available for trading will be tracked in a U.S. Dollar exchange ledger. In turn, the respective fiat will be maintained in one or more exchange bank accounts 722 in respective exchange bank(s) 720, that are typically held in the name of the digital asset exchange on behalf of its customers. A digital asset exchange may have one or more bank accounts, e.g., bank account 722, held at one or more banks 720, such as exchange banks or exchange partner banks, which are banks associated with and/or in partnership with the digital asset exchange. In embodiments, exchanges may access other repositories for fiat currency. An exchange bank account 722 may be a pass-through account that receives fiat currency deposits from a digital asset buyer and transfers the fiat currency to a digital asset seller. The exchange bank account may hold money in escrow while an exchange transaction is pending. For example, the exchange bank account may hold a digital asset buyer's fiat currency until a digital asset seller transfers digital assets to the buyer, to an exchange, or to an authorized third-party. Upon receipt by the appropriate recipient of the requisite amount of digital assets, the digital asset exchange may authorize the release of the fiat currency to the digital asset seller. In embodiments, an exchange may hold, e.g., as a custodian, fiat in bank accounts and digital assets in digital clients at associated digital asset addresses. In embodiments, instead of using bank accounts, other stable investment instruments such as money market mutual funds, treasury bills, CDs, low risk bonds, to name a few, may be used.

A digital asset exchange may have one or more digital asset exchange computer systems 712, which can include software running on one or more processors, as discussed herein, as well as computer-readable memory comprising one or more databases. A digital asset exchange can include one or more exchange digital asset clients, e.g., digital asset client 714. Exchange digital client may be used to store digital assets in one or more denominations from one or more parties to a transaction. In embodiments, the exchange digital clients may store digital assets owned by the digital asset exchange, which may be used when an exchange is a counterparty to an exchange transaction, and which can allow exchange transactions to occur even when a buyer and a seller are not otherwise both available and in agreement on transaction terms. Typically, access to such exchange digital clients is controlled by one or more private keys.

Figure 8:
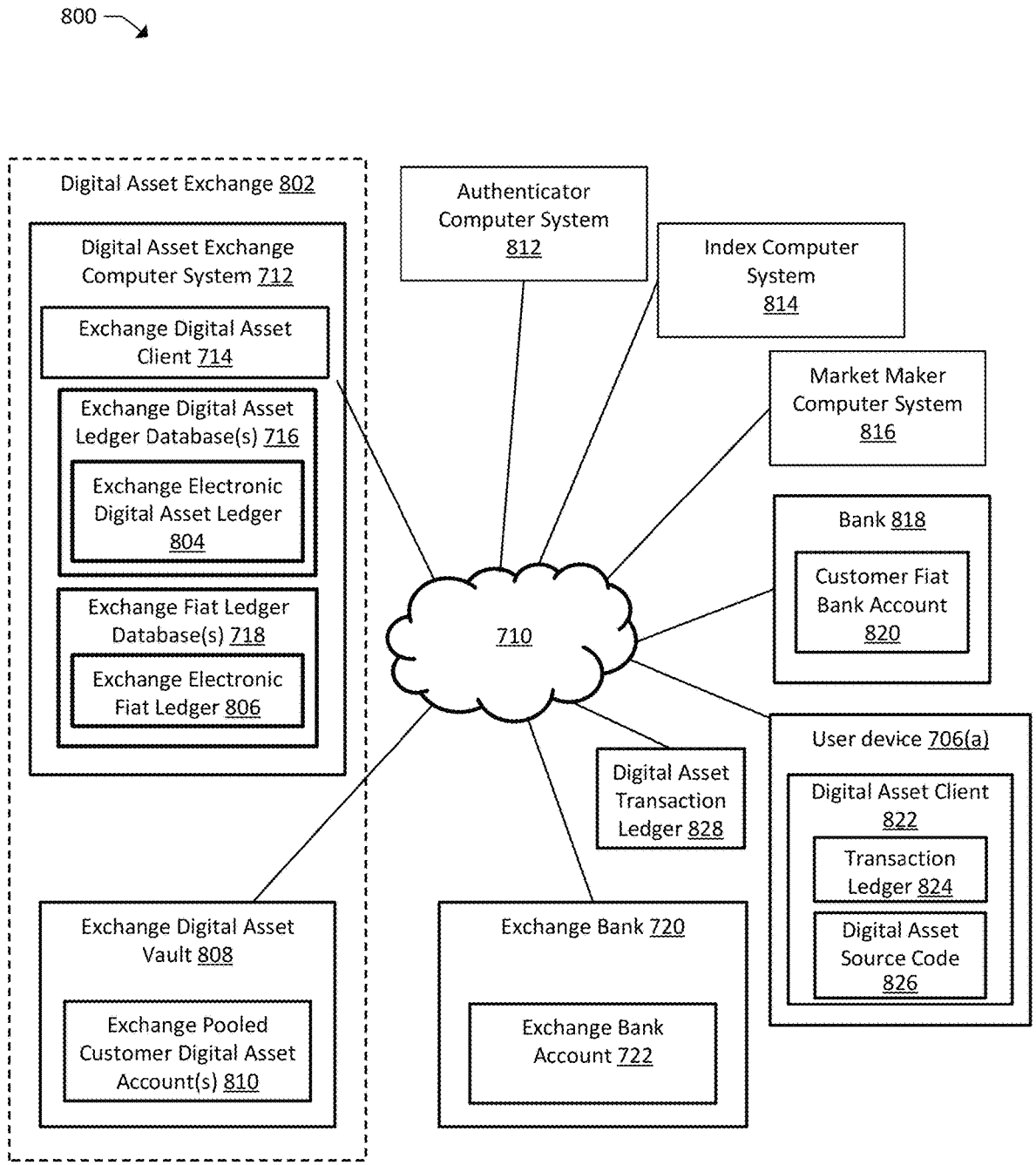
FIG. 8 illustrates a schematic diagram of additional features associated with a digital asset exchange.

FIG. 8 illustrates a schematic diagram 800 of additional features associated with a digital asset exchange. Each entity may operate one or more computer systems. Computer systems may be connected directly or indirectly, such as through a data network 710 (e.g., the Internet, a local area network, a wide area network, a proprietary network, to name a few). The digital asset exchange 802 may be associated with a digital asset exchange computer system 712, exchange digital asset clients 714, for example, associated with one or more digital asset addresses (e.g., BITCOIN clients, ETHEREUM clients, LITECOIN clients, to name a few), customer banks 818 having customer fiat bank accounts 820, a digital asset network transaction ledger 828 (e.g., the BITCOIN blockchain, the ETHEREUM blockchain, the LITECOIN blockchain, to name a few), a digital asset network (e.g., the BITCOIN network, the ETHEREUM network, the LITECOIN network, to name a few), one or more exchange customers using one or more customer user device 706(*a*), one or more exchange digital asset electronic ledger(s) 716 one or more exchange digital asset vaults 808, one or more exchange fiat electronic ledger databases(s) 718, and one or more exchange partner banks 720, which can have exchange bank account(s) 722 for holding pooled customer fiat, to name a few. The exchange digital asset vaults 808 can store a plurality of digital asset clients, which may be pooled exchange customer digital asset accounts 810 with associated digital asset addresses. In embodiments, the digital asset exchange 802 may have one or more partner banks 720, each with one or more respective exchange bank account(s) 722. Such account(s) may be associated with insurance protection, such as FDIC insurance protection in the U.S. In embodiments, the digital asset exchange 802 may also communicate with an authenticator computer system 812 (to authenticate users, e.g., using multi-factor authentication and/or comparisons to databases of flagged users, to name a few), an index computer system 814 (e.g., for generating and/or providing a digital asset index, which may be a price index), and/or a market maker computer system 816, to name a few. A market maker may be an exchange user, like a broker dealer or other entity, that provides liquidity for the digital asset exchange 802 by purchasing or selling digital assets. The user device 706(*a*) may include a digital asset client 822, which may include a transaction ledger 824 and digital asset source code 826.

The digital asset exchange 802 may employ an electronic ledger system to track customer digital assets and/or customer fiat holdings. Such a system may allow rapid electronic transactions among exchange customers and/or between exchange customers and the digital asset exchange 802 itself using its own digital asset and fiat holdings or those of its sponsor or owner. In embodiments, the electronic ledger system may facilitate rapid computer-based automated trading, which may comprise use by one or more computer systems of a trading API provided by the digital asset exchange 802. In embodiments, the electronic ledger system may also be used in conjunction with hot client digital asset security systems (e.g., where one or more private keys are maintained on a computer system that is immediately accessible), and/or cold storage digital asset security systems by the digital asset exchange 802 (e.g., where one or more private keys are maintained on a computer system that is off-line), to name a few. Fiat (e.g., USD) and digital assets (e.g., BITCOIN, ETHER, LITECOIN, to name a few) can be electronically credited and/or electronically debited from respective (e.g., fiat and digital asset) electronic ledgers.

Clearing of transactions may be recorded nearly instantaneously on the electronic ledgers. Deposits of fiat with the digital asset exchange 802 and withdrawals from the digital asset exchange 802 may be recorded on the exchange electronic fiat ledger 806, which may be provided in the exchange electronic fiat ledger database 718, while deposits and withdrawals of digital assets may be recorded on the exchange electronic digital asset ledger 804, which may be provided in the exchange digital asset ledger database 716. Electronic ledgers may be maintained using one or more computers operated by the digital asset exchange 802, its sponsor and/or agent, and stored on non-transitory computer-readable memory operatively connected to such one or more computers. In embodiments, electronic ledgers can be in the form of a database.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A digital asset wallet system comprising:
   one or more processors; and
   non-transitory computer-readable media storing instructions that, when executed by the one or more processors, cause the one or more processors to perform operations comprising:
      storing, by the digital asset wallet system, wallets associated with blockchain networks of various types;
      determining, by the digital asset wallet system, first functionality of the wallets that is shared amongst a threshold number of the wallets;
      generating, by the digital asset wallet system, a wallet library configured to implement the first functionality for a requested wallet associated with a first new blockchain network;
      receiving, by the digital asset wallet system, a first request for the requested wallet;
      determining, by the digital asset wallet system, second functionality of the requested wallet that is specific to the first new blockchain network, the second functionality being different from the first functionality;
      generating, by the digital asset wallet system, a first network sidecar associated with the first new blockchain network, the first network sidecar being configured to implement the second functionality of the requested wallet;
      generating, by the digital asset wallet system via the first network sidecar, a first mapping between first individual portions of the first functionality of the wallet library and second individual portions of the second functionality specific to the first new blockchain network; and
      generating, by the digital asset wallet system, the requested wallet based at least in part on the first mapping.

2. The digital asset wallet system of claim 1, the operations further comprising:
   determining, by the digital asset wallet, components of the wallets that are shared amongst the threshold number of the wallets; and
   causing the components to implement the first individual portions of the first functionality of the wallet library.

3. The digital asset wallet system of claim 1, wherein the requested wallet is a first requested wallet, and the operations further comprising:
   receiving, by the digital asset wallet system, a second request for a second requested wallet associated with a second new blockchain network;
   determining, by the digital asset wallet system, third functionality of the second requested wallet that is specific to the second new blockchain network, the third functionality being different from the first functionality and the second functionality;
   generating, by the digital asset wallet system, a second network sidecar associated with the second new blockchain network, the second network sidecar being configured to implement the third functionality of the second requested wallet;
   generating, by the digital asset wallet system via the second network sidecar, a second mapping between the first individual portions of the first functionality of the wallet library to third individual portions of the third functionality associated with the second new blockchain network; and
   generating, by the digital asset wallet system, the second requested wallet based at least in part on the second mapping.

4. The digital asset wallet system of claim 1, wherein the requested wallet is a core wallet.

5. The digital asset wallet system of claim 4, wherein the first request for the requested wallet is received from a full node associated with the first new blockchain network, and the operations further comprising verifying, via the network sidecar, transaction records associated with the core wallet based at least in part on the full node.

6. The digital asset wallet system of claim 1, wherein the wallet library is a first wallet library, the requested wallet is a first requested wallet, and the operations further comprising:
  determining, by the digital asset wallet system, third functionality of the wallets that is shared amongst the threshold number of wallets, the third functionality being different from the first functionality and the second functionality;
  generating a second wallet library configured to implement the third functionality for a second requested wallet associated with a second new blockchain network;
  generating, by the digital asset wallet system via a second network sidecar associated with the second new blockchain network, a second mapping between third individual portions of the third functionality of the second wallet library and fourth individual portions of fourth functionality specific to the second new blockchain network; and
  generating, by the digital asset wallet system, the second requested wallet based at least in part on the second mapping.

7. A method comprising:
  storing, by a digital asset wallet system, wallets associated with blockchain networks of various types;
  determining, by the digital asset wallet system, first functionality of the wallets that is shared amongst a threshold number of the wallets;
  generating, by the digital asset wallet system, a wallet library configured to implement the first functionality for a requested wallet associated with a first new blockchain network;
  receiving, by the digital asset wallet system, a first request for the requested wallet;
  determining, by the digital asset wallet system, second functionality of the requested wallet that is specific to the first new blockchain network, the second functionality being different from the first functionality;
  generating, by the digital asset wallet system, a first network sidecar associated with the first new blockchain network, the first network sidecar being configured to implement the second functionality of the requested wallet; and
  generating, by the digital asset wallet system, the requested wallet based at least in part on the wallet library and the first network sidecar.

8. The method of claim 7, further comprising:
  generating, by the digital asset wallet system via the first network sidecar, a first mapping between first individual portions of the first functionality of the wallet library and second individual portions of the second functionality specific to the first new blockchain network; and
  wherein generating the requested wallet is based at least in part on the first mapping.

9. The method of claim 7, further comprising:
  determining, by the digital asset wallet, components of the wallets that are shared amongst the threshold number of the wallets; and
  causing the components to implement the first individual portions of the first functionality of the wallet library.

10. The method of claim 7, wherein the requested wallet is a first requested wallet, and the method further comprising:
  receiving, by the digital asset wallet system, a second request for a second requested wallet associated with a second new blockchain network;
  determining, by the digital asset wallet system, third functionality of the second requested wallet that is specific to the second new blockchain network, the third functionality being different from the first functionality and the second functionality;
  generating, by the digital asset wallet system, a second network sidecar associated with the second new blockchain network, the second network sidecar being configured to implement the third functionality of the second requested wallet; and
  generating, by the digital asset wallet system, the second requested wallet based at least in part on the wallet library and the second network sidecar.

11. The method of claim 7, wherein the requested wallet is a core wallet.

12. The method of claim 11, wherein the first request for the requested wallet is received from a full node associated with the first new blockchain network, and the method further comprising verifying, via the network sidecar, transaction records associated with the core wallet based at least in part on the full node.

13. The method of claim 7, wherein the wallet library is a first wallet library, and the method further comprising:
  determining, by the digital asset wallet system, third functionality of the wallets that is shared amongst the threshold number of wallets, the third functionality being different from the first functionality and the second functionality;
  generating a second wallet library configured to implement the third functionality for the second requested wallet associated with a second new blockchain network; and
  generating, by the digital asset wallet system, the requested wallet based at least in part on the second wallet library and a second network sidecar associated with the second new blockchain network.

14. A digital asset wallet system comprising:
  one or more processors; and
  non-transitory computer-readable media storing instructions that, when executed by the one or more processors, cause the one or more processors to perform operations comprising:
    storing, by a digital asset wallet system, wallets associated with blockchain networks of various types;
    determining, by the digital asset wallet system, first functionality of the wallets that is shared amongst a threshold number of the wallets;
    generating, by the digital asset wallet system, a wallet library configured to implement the first functionality for a requested wallet associated with a first new blockchain network;
    receiving, by the digital asset wallet system, a first request for the requested wallet;
    determining, by the digital asset wallet system, second functionality of the requested wallet that is specific to the first new blockchain network, the second functionality being different from the first functionality;
    generating, by the digital asset wallet system, a first network sidecar associated with the first new blockchain network, the first network sidecar being configured to implement the second functionality of the requested wallet; and generating, by the digital asset wallet system, the requested wallet based at least in part on the wallet library and the first network sidecar.

15. The digital asset wallet system of claim 14, the operations further comprising:
   generating, by the digital asset wallet system via the first network sidecar, a first mapping between first individual portions of the first functionality of the wallet library and second individual portions of the second functionality specific to the first new blockchain network; and
   wherein generating the requested wallet is based at least in part on the first mapping.

16. The digital asset wallet system of claim 14, the operations further comprising:
   determining, by the digital asset wallet, components of the wallets that are shared amongst the threshold number of the wallets; and
   causing the components to implement the first individual portions of the first functionality of the wallet library.

17. The digital asset wallet system of claim 14, wherein the requested wallet is a first requested wallet, and the operations further comprising:
   receiving, by the digital asset wallet system, a second request for a second requested wallet associated with a second new blockchain network;
   determining, by the digital asset wallet system, third functionality of the second requested wallet that is specific to the second new blockchain network, the third functionality being different from the first functionality and the second functionality;
   generating, by the digital asset wallet system, a second network sidecar associated with the second new blockchain network, the second network sidecar being configured to implement the third functionality of the second requested wallet; and
   generating, by the digital asset wallet system, the second requested wallet based at least in part on the wallet library and the second network sidecar.

18. The digital asset wallet system of claim 14, wherein the requested wallet is a core wallet.

19. The digital asset wallet system of claim 18, wherein the first request for the requested wallet is received from a full node associated with the first new blockchain network, and the operations further comprising verifying, via the network sidecar, transaction records associated with the core wallet based at least in part on the full node.

20. The digital asset wallet system of claim 14, wherein the wallet library is a first wallet library, the requested wallet is a first requested wallet, and the operations further comprising:
   determining, by the digital asset wallet system, third functionality of the wallets that is shared amongst the threshold number of wallets, the third functionality being different from the first functionality and the second functionality;
   generating a second wallet library configured to implement the third functionality for a second requested wallet associated with a second new blockchain network; and
   generating, by the digital asset wallet system, the second requested wallet based at least in part on the second wallet library and a second network sidecar associated with the second new blockchain network.

* * * * *